US009697915B2

(12) United States Patent
Tsuge et al.

(10) Patent No.: US 9,697,915 B2
(45) Date of Patent: Jul. 4, 2017

(54) PIT GATE, PIT EQUIPMENT, NUCLEAR POWER FACILITY, AND INSTALLATION METHOD OF PIT GATE

(71) Applicant: MITSUBISHI HEAVY INDUSTRIES, LTD., Tokyo (JP)

(72) Inventors: Takafumi Tsuge, Tokyo (JP); Takao Ito, Tokyo (JP); Yuki Matsushima, Fukuoka (JP)

(73) Assignee: MITSUBISHI HEAVY INDUSTRIES, LTD., Minato-ku, Tokyo (JP)

( * ) Notice: Subject to any disclaimer, the term of this patent is extended or adjusted under 35 U.S.C. 154(b) by 245 days.

(21) Appl. No.: 14/751,421

(22) Filed: Jun. 26, 2015

(65) Prior Publication Data
US 2016/0141055 A1    May 19, 2016

(30) Foreign Application Priority Data

Nov. 19, 2014  (JP) .................................. 2014-234864

(51) Int. Cl.
*G21C 13/028*  (2006.01)
*E06B 7/16*    (2006.01)
(Continued)

(52) U.S. Cl.
CPC .............. *G21C 13/028* (2013.01); *E06B 7/16* (2013.01); *G21C 19/07* (2013.01); *G21C 19/18* (2013.01); *G21F 7/005* (2013.01); *Y02E 30/40* (2013.01)

(58) Field of Classification Search
CPC ... E02B 7/28; E02B 8/04; E02B 13/02; E02B 3/102
(Continued)

(56) References Cited

U.S. PATENT DOCUMENTS 1,006,730 A * 10/1911  Dougherty et al. ...... E02B 7/54
                                                    405/87
1,663,406 A *  3/1928  Holmes ..................... E02B 7/54
                                                    405/105
(Continued)

FOREIGN PATENT DOCUMENTS

EP    0 389 712 A2   10/1990
GB       970747 A *  9/1964  ............. E02B 13/02
(Continued)

OTHER PUBLICATIONS

Extended European Search Report (EESR) dated Apr. 14, 2016, issued in counterpart European Patent Application No. 15 174 189.9. (7 pages).

*Primary Examiner* — Tara M. Pinnock
(74) *Attorney, Agent, or Firm* — Westerman, Hattori, Daniels & Adrian, LLP

(57) ABSTRACT

A pit gate 15 that is accommodated in a slot 14 and that seals service water retained in a first pit and a second pit in a watertight manner includes a gate main body 21; a sealing member 22 that is provided on a surface opposite to the slot 14 in a gate main body 21 and that seals between the gate main body 21 and the slot 14 in a watertight manner; and an upper pressing clamp 23, an intermediate pressing clamp 24, and a lower pressing clamp 25 that are provided in the gate main body 21 and that moves gate main body 21 toward the sealing member 22 side due to the weight of the gate main body 21 itself.

14 Claims, 8 Drawing Sheets

(51) Int. Cl.
*G21C 19/07* (2006.01)
*G21C 19/18* (2006.01)
*G21F 7/005* (2006.01)

(58) Field of Classification Search
USPC .................................................. 405/87, 107
See application file for complete search history.

(56) References Cited

U.S. PATENT DOCUMENTS

| | | | | |
|---|---|---|---|---|
| 4,070,863 | A * | 1/1978 | Brown | E02B 7/54 |
| | | | | 405/105 |
| 4,253,400 | A * | 3/1981 | Fischer | F16K 3/184 |
| | | | | 105/282.3 |
| 4,265,564 | A * | 5/1981 | Watelet | E02B 7/54 |
| | | | | 405/105 |
| 4,514,110 | A | 4/1985 | Powell | |
| 8,001,735 | B2 * | 8/2011 | Fisher | E06B 9/02 |
| | | | | 405/107 |
| 8,393,827 | B1 * | 3/2013 | Happel | E03F 5/105 |
| | | | | 251/326 |
| 9,127,426 | B2 * | 9/2015 | Wu | E02B 7/28 |

FOREIGN PATENT DOCUMENTS

| | | | |
|---|---|---|---|
| GB | 2 302 723 | A | 1/1997 |
| JP | 10-332869 | A | 12/1998 |

* cited by examiner

PIT GATE, PIT EQUIPMENT, NUCLEAR POWER FACILITY, AND INSTALLATION METHOD OF PIT GATE

FIELD

The present invention relates to a pit gate that seals service water retained in a pit in a watertight manner, pit equipment, a nuclear power facility, and an installation method of the pit gate.

BACKGROUND

Conventionally, there is a known pool gate provided in a canal unit, which is provided between pools constructed inside a nuclear reactor building in a nuclear power generating station or inside a building adjacent to the nuclear reactor building, such that both pools are partitioned by the pool gate (for example, see Patent Literature 1). This pool gate has a U-shaped packing that is in contact with the wall surface of the pool on the canal unit side or in contact with a slot and receives the lateral direction load due to water pressure. At this time, the packing, which is an elastic packing, is pressurized and is thus brought into close contact with the wall surface on the canal unit side or contact with the slot, whereby exhibiting the sealing function.

CITATION LIST

Patent Literature

Patent Literature 1: Japanese Laid-open Patent Publication No. 10-332869

SUMMARY

Technical Problem

However, with the packing used in Patent Literature 1, because the sealing function is not operated unless pressurization is performed by the pressure source, the pressure source is needed to ensure the sealing property due to the pool gate. Accordingly, to enhance the rationality, a pit gate with a simple structure that does not need a pressure source has been proposed. In this case, because pressurization is not performed by the pressure source, in an initial state in which a lateral direction load due to water pressure is not applied to a gate before water in a pit is drained, the contact property between the packing and the wall surface is decreased and thus possibly resulting in a decrease in the sealing property.

Accordingly, an object of the present invention is to provide a pit gate that is brought into close contact with a slot even if the pit gate has a simple structure, pit equipment, a nuclear power facility, and an installation method of the pit gate.

Solution to Problem

According to an aspect of the present invention, a pit gate that is accommodated in a slot and that seals service water retained in the pit in a watertight manner, comprising: a gate main body; a sealing member that is provided on a surface opposite to the slot in the gate main body and that seals between the gate main body and the slot in a watertight manner; and a pressing clamp that is provided in the gate main body and that moves the gate main body toward the sealing member side due to a weight of the gate main body itself.

According to this configuration, because the gate main body can be moved toward the sealing member side by the pressing clamp, the sealing member can be appropriately brought into close contact with the slot. Consequently, because it is possible to seal between the gate main body and the slot by the sealing member in a watertight manner, the leakage of service water from the pit can be suppressed.

Advantageously, in the pit gate, the sealing member is formed so as to protrude toward the slot side in cross section.

According to this configuration, the shape of the sealing member can be easily brought into close contact with the slot.

Advantageously, in the pit gate, the pressing clamp includes a first gate-side pressing member that is provided on a surface of the gate main body opposite from a surface on which the sealing member is provided, and the first gate-side pressing member is formed in a wedge shape whose thickness becomes thinner from the upper side toward the lower side in the vertical direction, so that a first gate-side inclined surface that is inclined toward the sealing member side from the upper side toward the lower side in the vertical direction is formed.

According to this configuration, if the gate main body is accommodated in the slot from the upper side toward the lower side in the vertical direction, the gate main body moves toward the sealing member side due to the first gate-side inclined surface. Consequently, the gate main body can be appropriately moved toward the sealing member side by the pressing clamp.

Advantageously, in the pit gate, the pressing clamp includes a second gate-side pressing member that is shaped as a rod and that is provided so as to protrude from the gate main body along the horizontal direction, and a second slot-side pressing member that is in contact with the second gate-side pressing member and that is provided in the slot that faces a surface opposite from a surface on which the sealing member of the gate main body is provided, and the second slot-side pressing member is formed in a wedge shape whose thickness becomes greater from the upper side toward the lower side in the vertical direction, so that a second slot-side inclined surface that is inclined toward the sealing member side from the upper side toward the lower side in the vertical direction is formed, and the second gate-side pressing member comes into contact with the second slot-side inclined surface, so that the second gate-side pressing member moves the gate main body toward the sealing member side.

According to this configuration, if the gate main body is accommodated in the slot from the upper side toward the lower side in the vertical direction, because the second gate-side pressing member in the gate main body moves toward the sealing member side along the second slot-side inclined surface of the second slot-side pressing member, the gate main body moves toward the sealing member side. Consequently, the gate main body can be appropriately moved toward the sealing member side by the pressing clamp.

Advantageously, in the pit gate, the pressing clamp includes a third gate-side pressing member that is provided so as to protrude from the gate main body toward the lower side in the vertical direction, and a third slot-side pressing member that is in contact with the third gate-side pressing member and that is provided on a bottom portion of the slot, and the third slot-side pressing member is formed in a wedge shape whose thickness becomes greater from the upper side toward the lower side in the vertical direction, so that a third slot-side inclined surface that is inclined toward the sealing member side from the upper side toward the lower side in the vertical direction is formed, and the third gate-side pressing member comes into contact with the third slot-side inclined surface, so that the third gate-side pressing member moves the gate main body toward the sealing member side.

According to this configuration, if the gate main body is accommodated in the slot from the upper side toward the lower side in the vertical direction, because the third gate-side pressing member in the gate main body moves toward the sealing member side along the third slot-side inclined surface of the third slot-side pressing member, the gate main body moves toward the sealing member side. Consequently, the gate main body can be appropriately moved toward the sealing member side by the pressing clamp.

Advantageously, in the pit gate, a plurality of the pressing clamps is provided at a predetermined distance in the vertical direction of the gate main body, the plurality of the pressing clamps includes a first pressing clamp, a second pressing clamp, and a third pressing clamp, the first pressing clamp includes a first gate-side pressing member that is provided on a surface of the gate main body opposite from a surface on which the sealing member is provided, the first gate-side pressing member is formed in a wedge shape whose thickness becomes thinner from the upper side toward the lower side in the vertical direction, so that a first gate-side inclined surface that is inclined toward the sealing member side from the upper side toward the lower side in the vertical direction is formed, and the second pressing clamp includes a second gate-side pressing member that is shaped as a rod and that is provided so as to protrude from the gate main body along the horizontal direction, and a second slot-side pressing member that is in contact with the second gate-side pressing member and that is provided on the slot that faces a surface opposite from a surface on which the sealing member of the gate main body is provided, and the second slot-side pressing member is formed in a wedge shape whose thickness becomes greater from the upper side toward the lower side in the vertical direction, so that a second slot-side inclined surface that is inclined toward the sealing member side from the upper side toward the lower side in the vertical direction is formed, the second gate-side pressing member comes into contact with the second slot-side inclined surface, so that the second gate-side pressing member moves the gate main body toward the sealing member side, and the third pressing clamp includes a third gate-side pressing member that is provided so as to protrude from the gate main body toward the lower side in the vertical direction, and a third slot-side pressing member that is in contact with the third gate-side pressing member and that is provided on a bottom portion of the slot, and the third slot-side pressing member is formed in a wedge shape whose thickness becomes greater from the upper side toward the lower side in the vertical direction, so that a third slot-side inclined surface that is inclined toward the sealing member side from the upper side toward the lower side in the vertical direction is formed, and the third gate-side pressing member comes into contact with the third slot-side inclined surface, so that the third gate-side pressing member moves the gate main body toward the sealing member side.

According to this configuration, if the gate main body is accommodated in the slot from the upper side toward the lower side in the vertical direction, the gate main body moves toward the sealing member side along the first gate-side inclined surface, the second slot-side inclined surface, and the third slot-side inclined surface. Consequently, the gate main body can be appropriately moved toward the sealing member side in the vertical direction by the first pressing clamp, the second pressing clamp, and the third pressing clamp.

Advantageously, in the pit gate, the first gate-side inclined surface, the second slot-side inclined surface, and the third slot-side inclined surface have the same inclination angle with respect to the horizontal plane.

According to this configuration, by using the same inclination angle of the first gate-side inclined surface, the second slot-side inclined surface, and the third slot-side inclined surface, the amount of movement of the gate main body toward the sealing member side with respect to the amount of movement of the gate main body in the vertical direction can be made equal to the amount of movement of the first pressing clamp, the second pressing clamp, and the third pressing clamp. Consequently, the pressing force of the gate main body applied to the slot side can be made uniform in the vertical direction of the gate main body.

Advantageously, in the pit gate, the thickness direction of the gate main body is a direction in which a surface on which the sealing member is provided faces a surface opposite side on which the sealing member is provided, and the second gate-side pressing member is provided closer to the other side on which the sealing member is provided with respect to the center in the thickness direction of the gate main body.

According to this configuration, because the second gate-side pressing member can be disposed closer to the second slot-side pressing member side, it is possible to appropriately ensure the amount of movement of the second gate-side pressing member toward the sealing member side.

Advantageously, in the pit gate, the second slot-side pressing member and the third slot-side pressing member are provided in the slot that faces a surface opposite from a surface on which the sealing member of the gate main body is provided and are provided in the slot that faces the surface on which the sealing member of the gate main body is provided.

According to this configuration, even if the position of the gate main body with respect to the slot is inverted by 180° such that the surface on which the sealing member is provided is replaced with a surface opposite from the surface on which the sealing member is provided, the gate main body can be moved toward the sealing member side by the first pressing clamp, the second pressing clamp, and the third pressing clamp. Consequently, the position of the gate main body can be replaced.

Advantageously, in the pit gate, a plurality of the second pressing clamps is provided at a predetermined distance in the vertical direction of the gate main body, the second gate-side pressing member on the upper side in the vertical direction is formed such that the protruding length from the gate main body is greater than that of the second gate-side pressing member on the lower side in the vertical direction, and the second slot-side pressing member on the upper side in the vertical direction is disposed on the outer side in the horizontal direction with respect to the gate main body than the second slot-side pressing member on the lower side in the vertical direction.

According to this configuration, even if a plurality of the second pressing clamps is provided in the vertical direction, it is possible to avoid physical interference between the second pressing clamps.

Advantageously, in the pit gate, the gate main body includes a waveform member that has a wave shape and in which peak portions and valley portions are alternately formed from the upper side toward the lower side in the vertical direction, and the waveform member is formed such that the pitch between the adjacent peak portions in the vertical direction is narrower toward the lower side in the vertical direction.

According to this configuration, because water pressure on the lower side in the vertical direction is higher than that on the upper side, by narrowing the pitch on the lower side in the vertical direction, the gate main body has a structure that can appropriately endure water pressure.

According to another aspect of the present invention, a pit equipment comprising: a first pit; a second pit; a channel that connects the first pit and the second pit; a slot provided in the channel; and any one of the above pit gate accommodated in the slot.

According to this configuration, the channel can be partitioned in a watertight manner by using the pit gate with a simple structure. Consequently, between the first pit and the second pit, even if service water is drained from one of the pits, the leakage of service water from the other pit can be suppressed.

According to still another aspect of the present invention, a nuclear power facility is provided with the above pit equipment.

According to this configuration, between the first pit and the second pit, even if service water is drained from one of the pits, in the other pit that is filled with the service water, fuel used in the nuclear power facility can be appropriately treated.

According to still another aspect of the present invention, an installation method for installing a pit gate in the slot in the pit equipment above, comprising: installing, in a state in which the first pit, the second pit, and the channel are filled with the service water, by facing a surface on which the sealing member is provided, the pit gate in the slot on the first pit side or the second pit side from which the service water is supposed to be drained.

According to this configuration, by setting the position of the pit gate with respect to the slot to the position in accordance with the first pit or the second pit from which the service water is drained and by accommodating the pit gate in the slot, the channel can be easily partitioned.

Advantageously, in the installation method, further comprising: forming the first pit and the second pit by being depressed from a floor surface; fixing the pit gate to the floor surface via a spacer; and adjusting the height of the spacer in accordance with the protrusion state of the sealing member toward the slot side.

According to this configuration, if the protruding length of the sealing member toward the slot side is small, by reducing the height of the spacer, the amount of movement of the pit gate with respect to the slot in the height direction can be increased, whereby the amount of movement toward the sealing member side can be increased. Consequently, by adjusting the height of the spacer, the contact property to the slot can be adjusted in accordance with the degree of degradation of the sealing member.

DESCRIPTION OF EMBODIMENTS

Preferred embodiment according to the present invention will be described in detail below with reference to the accompanying drawings. The present invention is not limited to the embodiment. Furthermore, for the components described in the embodiment below, components that can be easily substituted by those skilled in the art or components that are substantially the same are included. Furthermore, the components described below may be appropriately used in combination and, furthermore, if several embodiments are present, the embodiments can be used in combination.

Embodiment

Figure 1:
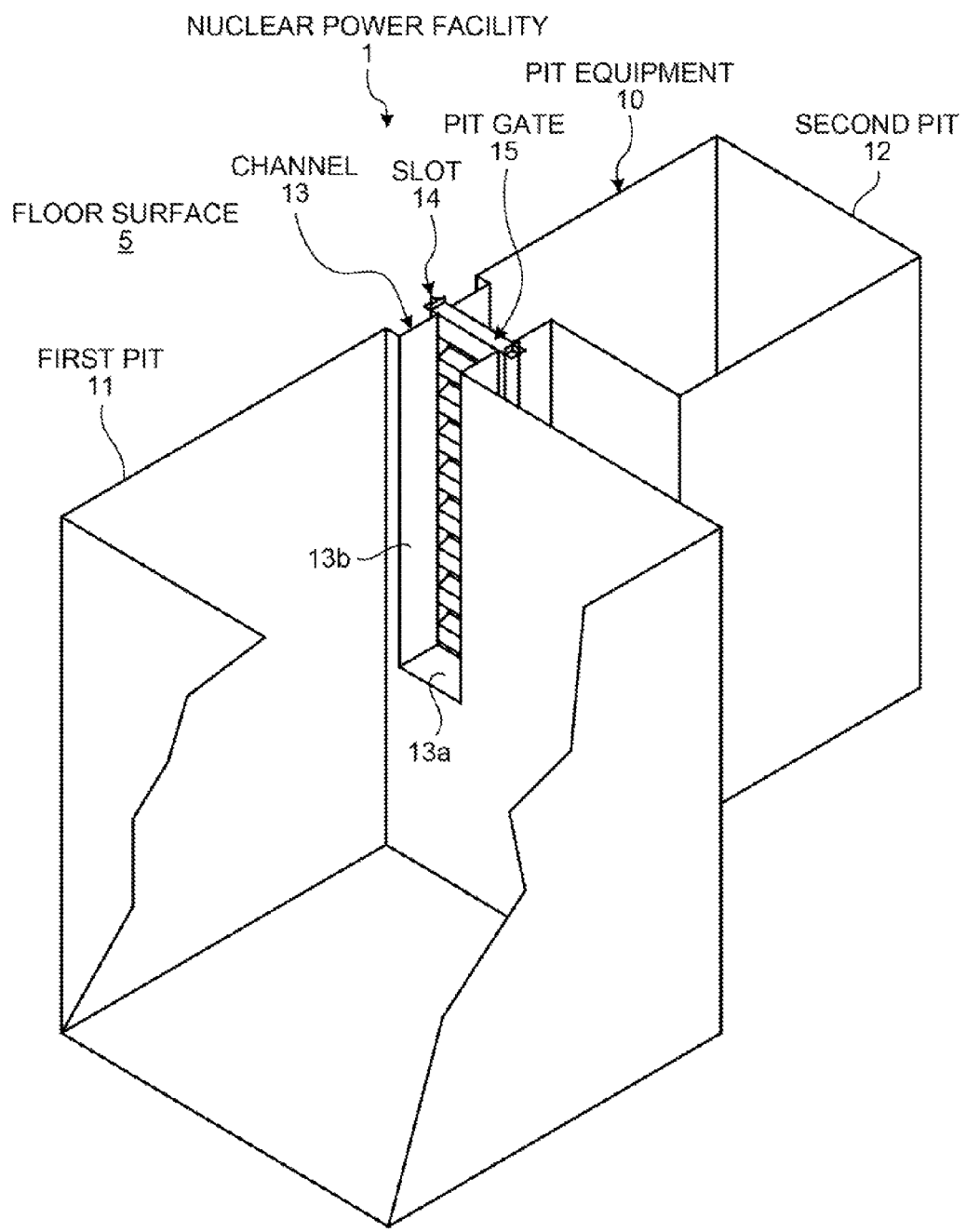
FIG. 1 is an external perspective view illustrating pit equipment provided in a nuclear power facility according to an embodiment.

FIG. 1 is an external perspective view illustrating pit equipment provided in a nuclear power facility according to an embodiment. A nuclear power facility 1 provided with pit equipment 10 according to an embodiment is a facility that stores therein fuel or that replaces fuel and is, for example, a nuclear power plant, a reprocessing facility, or the like.

The pit equipment 10 is provided so as to be dipped below a floor surface 5 and is filled with service water. This service water functions as a coolant that cools fuel and also functions as a moderator that decelerates a neutron generated from the fuel. For example, water is used as the service water. In the pit equipment 10, fuel is dipped in the filled service water and, in this state, the fuel is treated. As illustrated in FIG. 1, The pit equipment 10 includes a first pit 11, a second pit 12, a channel (also called a canal) 13, a slot 14, and a pit gate 15.

The first pit 11 is formed as a hollow cuboid and one end of the channel 13 is connected to one surface of the first pit 11. The volume of the first pit 11 is greater than that of the second pit 12. The first pit 11 is covered by a lining material having a sealing property such that inside the first pit 11 becomes a watertight state.

Similarly to the first pit 11, the second pit 12 is formed as a hollow and the other end of the channel 13 is connected to one surface of the second pit 12. The volume of the second pit 12 is smaller than that of the first pit 11. Similarly to the first pit 11, the second pit 12 is also covered by a lining material having a sealing property such that inside the second pit 12 becomes a watertight state. The shapes of the first pit 11 and the second pit 12 are not limited to the shapes described above and any shape may also be used.

For the channel 13, one end of the channel 13 is connected to the first pit 11 and the other end of the channel 13 is connected to the second pit 12. The extending direction of the channel 13, i.e., the direction in which the first pit 11 and the second pit 12 face each other is defined to be the length direction; the vertical direction (the top-to-bottom direction in FIG. 1) is defined to be the height direction; and the direction orthogonal to the length direction and the height direction is defined to be the width direction.

The size of the channel 13 is large enough for fuel to move between the first pit 11 and the second pit 12. The channel 13 is formed by a bottom surface 13a, which is formed on the lower side in the height direction, and two side surfaces 13b, which are formed on both sides of the bottom surface 13a in the width direction. Because the channel 13 communicates the first pit 11 and the second pit 12, the service water filled in the first pit 11 and the second pit 12 freely flows; therefore, the water level of the service water filled in the first pit 11 is the same as that filled in the second pit 12.

The slot 14 is provided in the channel 13 and has space that can accommodate therein the pit gate 15. The slot 14 is formed so as to be slightly larger than the channel 13 in a cross section perpendicular to the length direction. Namely, the slot 14 has a bottom surface 14a, which is formed by being depressed from the bottom surface 13a of the channel 13 (see FIG. 2), and two side surfaces 14b (see FIG. 2), which is formed on both sides of the bottom surface 14a in the width direction and formed by being depressed from the two side surfaces 13b of the channel 13. Furthermore, because the slot 14 is formed by being depressed from the channel 13, two U-shaped side surfaces are formed on both sides of the bottom surface 13a in the length direction and these U-shaped side surfaces act as sealing surfaces 14c (see FIG. 2) that are brought into close contact with the pit gate 15, which will be described later. Namely, one of the two sealing surfaces 14c corresponds to the surface of the slot 14 on the first pit 11 side and the other one of the sealing surfaces 14c corresponds to the surface of the slot 14 on the second pit 12 side. Furthermore, each of the two sealing surfaces 14c is formed on the flat surface.

Figure 2:
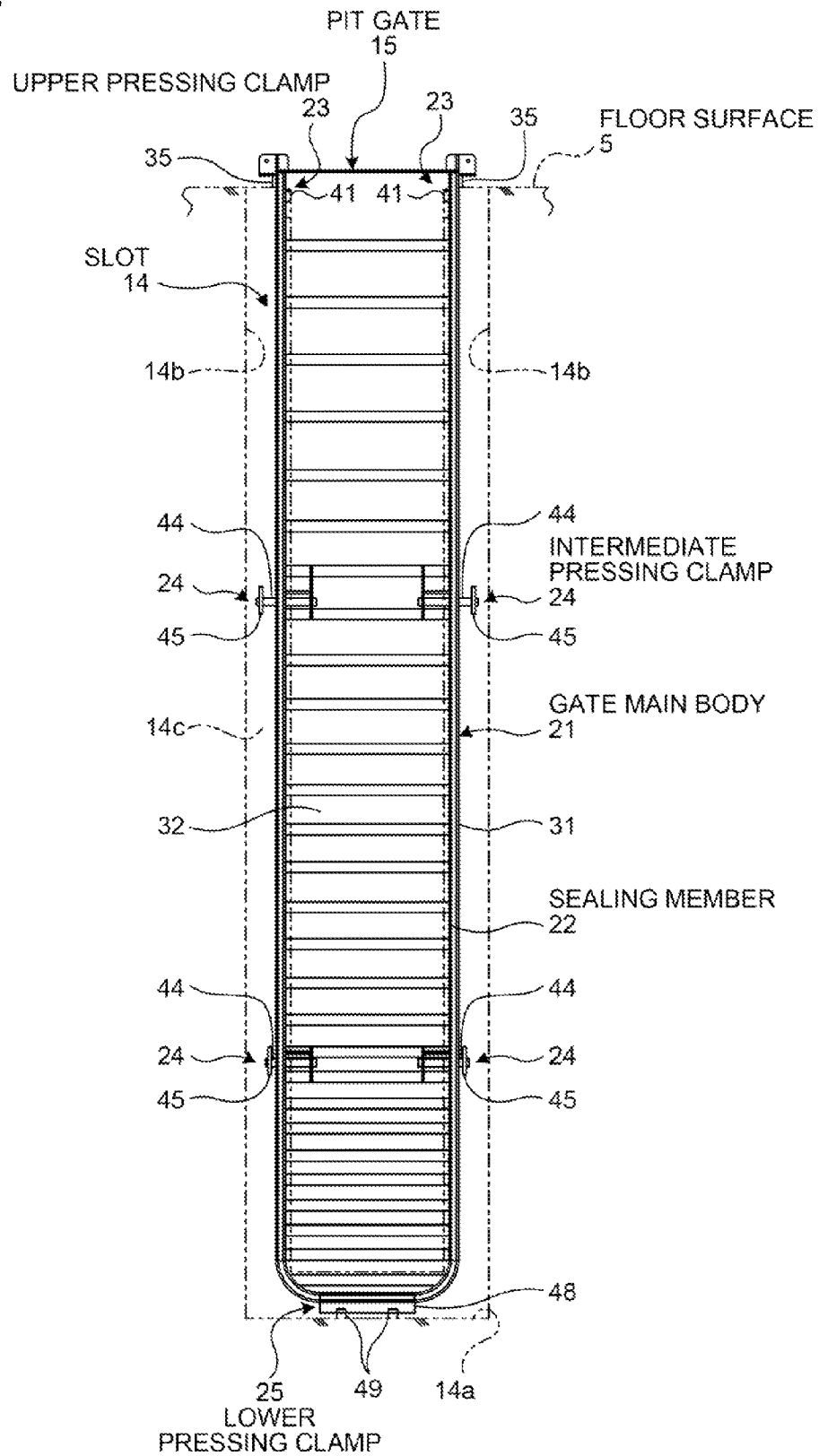
FIG. 2 is a front view of a pit gate according to the embodiment.
Figure 3:
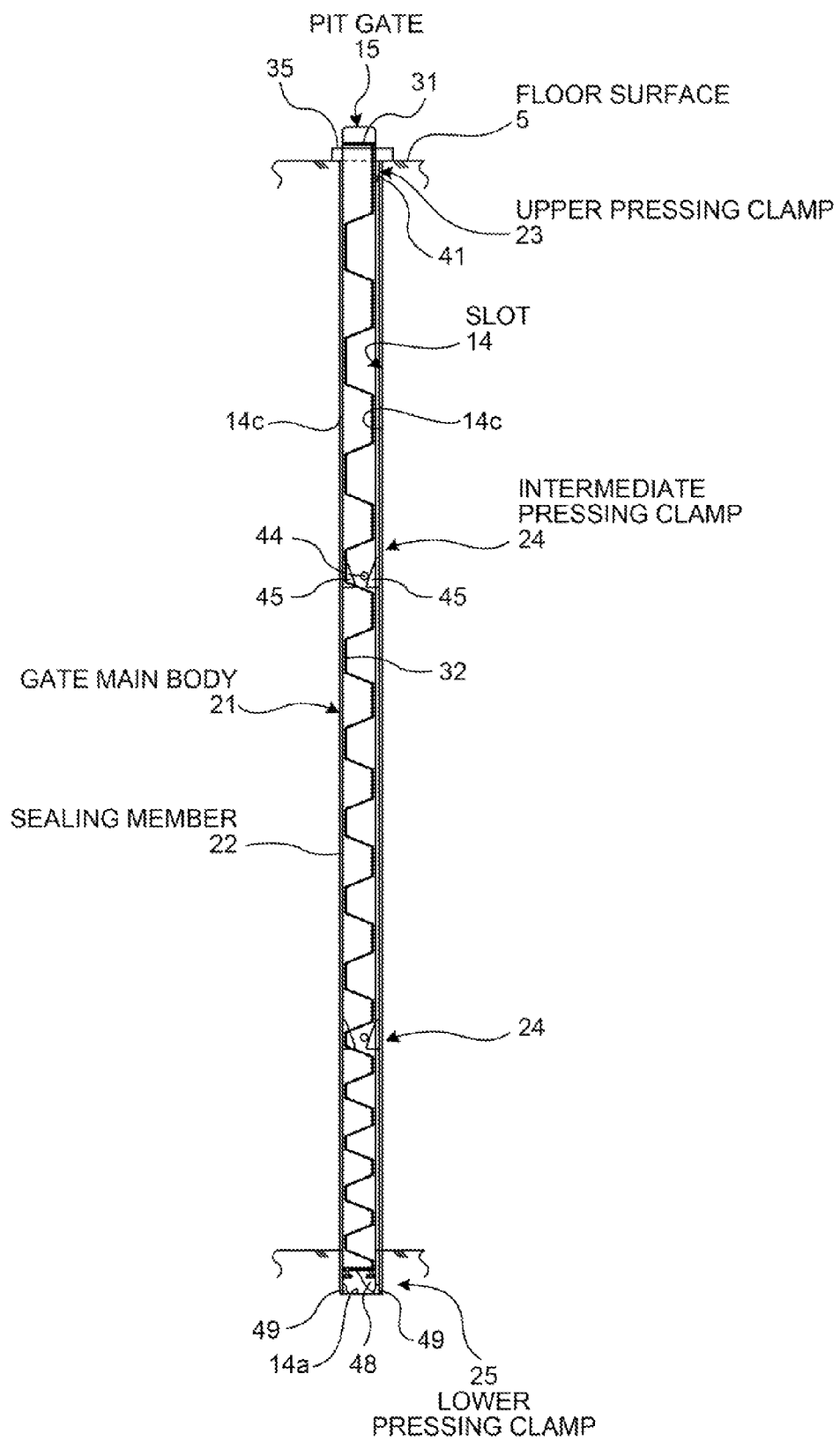
FIG. 3 is a side view of the pit gate according to the embodiment.
Figure 4:
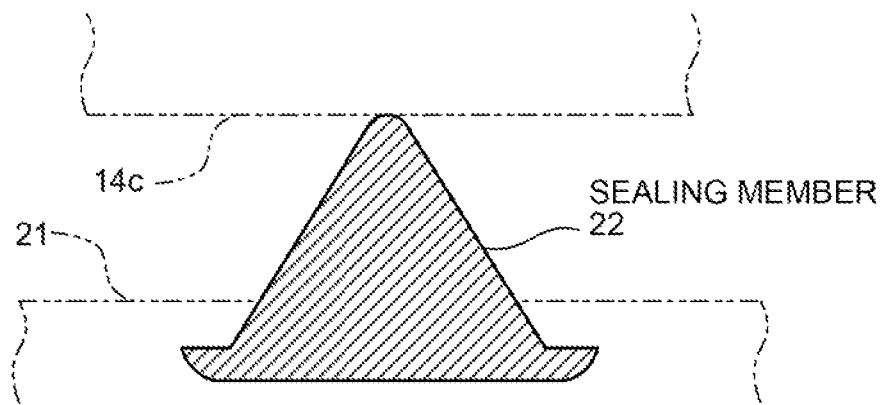
FIG. 4 is a sectional view of a sealing member.
Figure 5:
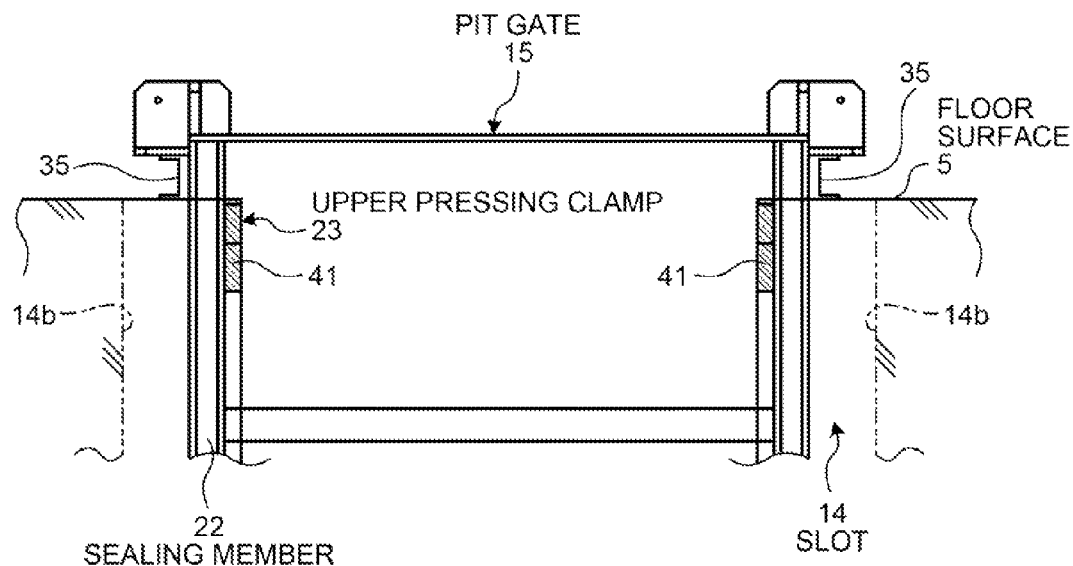
FIG. 5 is a front view of an upper pressing clamp.
Figure 6:
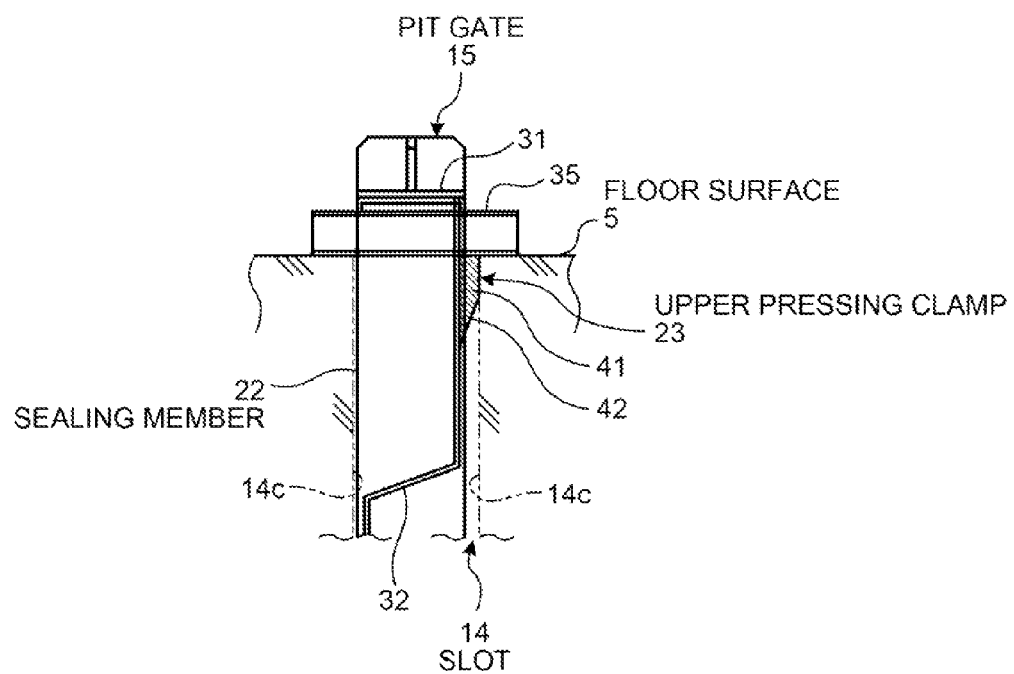
FIG. 6 is a side view of the upper pressing clamp.
Figure 7:
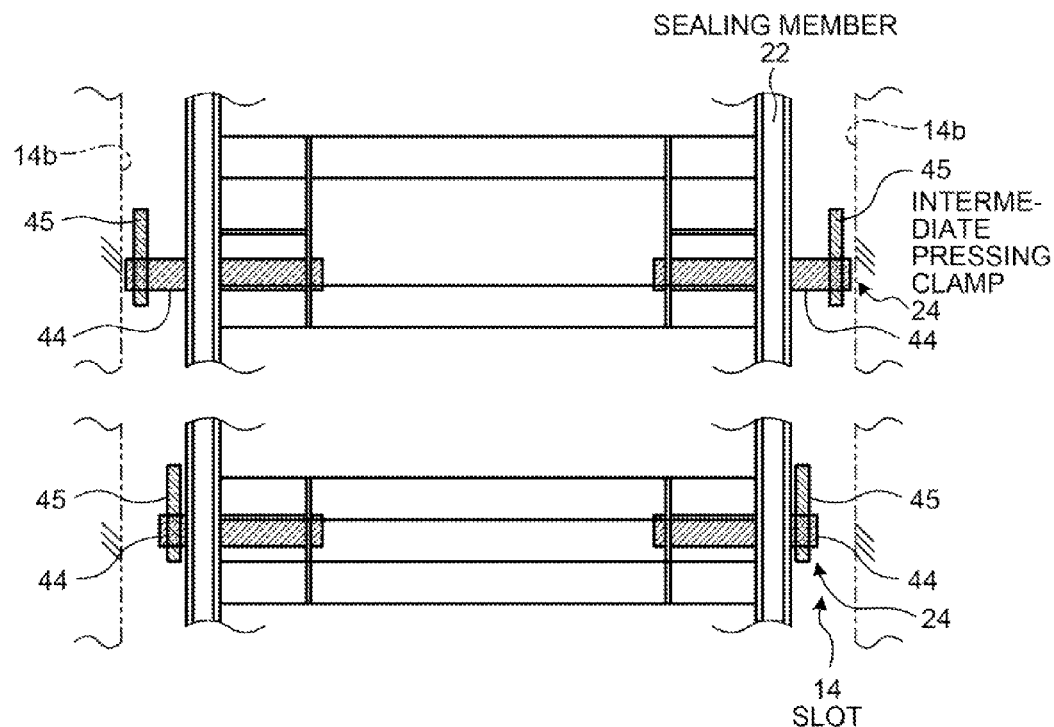
FIG. 7 is a front view of an intermediate pressing clamp.
Figure 8:
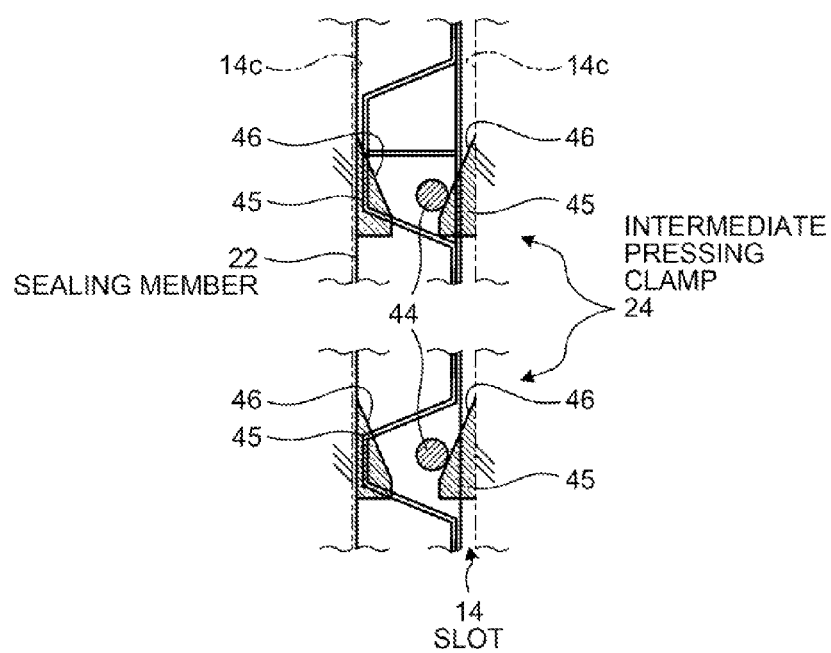
FIG. 8 is a side view of the intermediate pressing clamp.
Figure 9:
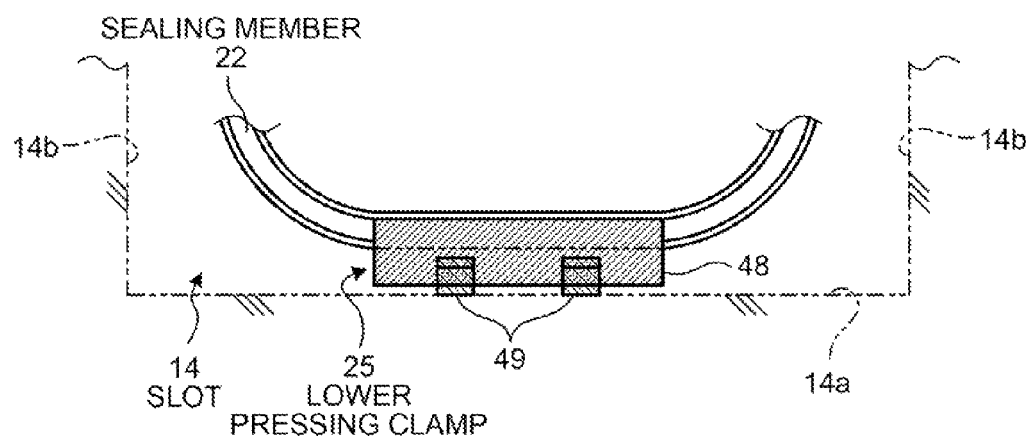
FIG. 9 is a front view of a lower pressing clamp.
Figure 10:
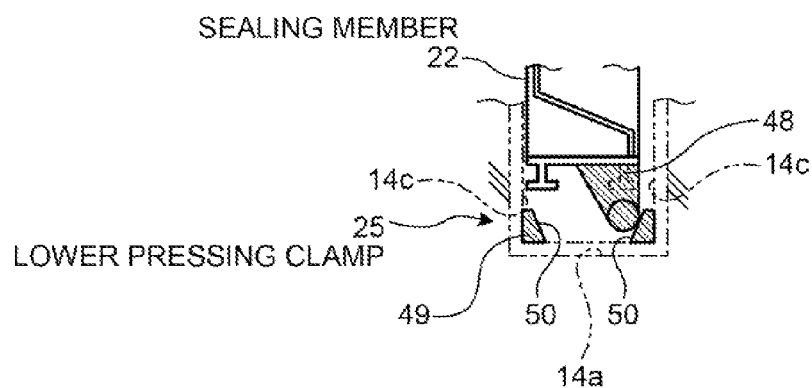
FIG. 10 is a side view of the lower pressing clamp.

In the following, the pit gate 15 will be described with reference to FIGS. 2 to 10. FIG. 2 is a front view of a pit gate according to the embodiment and FIG. 3 is a side view of the pit gate according to the embodiment. FIG. 4 is a sectional view of a sealing member. FIG. 5 is a front view of an upper pressing clamp and FIG. 6 is a side view of the upper pressing clamp. FIG. 7 is a front view of an intermediate pressing clamp and FIG. 8 is a side view of the intermediate pressing clamp. FIG. 9 is a front view of a lower pressing clamp and FIG. 10 is a side view of the lower pressing clamp.

The pit gate 15 is accommodated in the slot 14 and partitions the channel 13 in a watertight manner by water pressure applied from one of the first pit 11 and the second pit 12 generated due to water in one of the first pit 11 and the second pit 12 being drained. Here, for the pit gate 15, the length direction of the channel 13 corresponds to the thickness direction, the width direction of the channel 13 corresponds to the width direction, and the height direction of the channel 13 corresponds to the longitudinal direction. As illustrated in FIGS. 2 and 3, the pit gate 15 includes a gate main body 21, a sealing member 22, an upper pressing clamp (a first pressing clamp) 23, two intermediate pressing clamps (second pressing clamps) 24, and a lower pressing clamp (a third pressing clamp) 25. At this point, the upper pressing clamp 23, the two intermediate pressing clamps 24, and the lower pressing clamp 25 are provided at a predetermined distance in the longitudinal direction.

The gate main body 21 is formed so as to have the length in the longitudinal direction and is accommodated in the slot 14 such that the longitudinal direction of the gate main body 21 corresponds to the height direction. The gate main body 21 constructed by including a gate frame 31 and a waveform member 32 that is provided inside the gate frame 31.

The gate frame 31 is formed on four sides, i.e., on the upper side of the longitudinal direction, on the lower side of the longitudinal direction, on the left side of the width direction, and the right side of the width direction, so as to surround the circumference of the waveform member 32. In the state in which the gate frame 31 is accommodated in the slot 14, the three sides, i.e., the lower side of the longitudinal direction, the left side of the width direction, and the right side of the width direction, are formed opposite to the sealing surface 14c of the slot 14. The upper portion of the gate frame 31 is fixed to the floor surface 5 of the pit equipment 10 via a spacer 35. Furthermore, gate-side pressing members 41, 44, and 48 of the upper pressing clamp 23, the intermediate pressing clamp 24, and the lower pressing clamp 25, respectively, which will be described later, are attached to the gate frame 31.

The waveform member 32 is a wave-shaped member in which peak portions and valley portions are alternately formed from the upper side toward the lower side in the longitudinal direction. The waveform member 32 is integrally fixed to the gate frame 31. The peak portions and the valley portions of the waveform member 32 are formed so as to extend in the width direction, the pitch between the adjacent peak portions in the height direction, in other words, the pitch between the adjacent valley portions in the longitudinal direction, is formed to be narrower from the upper side toward the lower side in the longitudinal direction. This is because, for the water pressure applied to the waveform member 32 in the pit gate 15, the lower side of the waveform member 32 in the longitudinal direction is greater than that applied to the upper side of the waveform member 32.

The sealing member 22 is provided on the gate frame 31 at the position opposite to the sealing surface 14c of the slot 14. Namely, the sealing member 22 is provided on one of the surfaces of the gate main body 21 (the gate frame 31) in the thickness direction. The sealing member 22 is provided along the gate frame 31 and is continuously disposed, in a U-shaped manner, on the lower side in the longitudinal direction and on the left and right sides in the width direction. Accordingly, the sealing member 22 can be brought into close contact with the U-shaped sealing surface 14c of the slot 14 along with the shape of the sealing surface 14c.

As illustrated in FIG. 4, the sealing member 22 is solid in which hollow space is not formed inside thereof and is formed in a substantially triangular shape whose cross section protrudes toward the sealing surface 14c side. The sealing member 22 is made by using, for example, silicone rubber.

As illustrated in FIGS. 5 and 6, the upper pressing clamp 23 constructed by including a pair of upper gate-side pressing members (first gate-side pressing members) 41 that are provided on the other side of the surface of the gate main body 21 (the gate frame 31) in the thickness direction, i.e., on the surface opposite from the sealing member 22. The pair of the upper gate-side pressing members 41 is provided on both sides of the gate main body 21 in the width direction. Each of the upper gate-side pressing members 41 is formed in a wedge shape whose thickness becomes thinner from the upper side toward the lower side in the longitudinal direction. One of the surfaces of the upper gate-side pressing member 41 in the thickness direction is an attachment surface that is attached to the gate main body 21 and, on the other surface of the attachment surface, a first gate-side inclined surface 42 is formed. The upper gate-side inclined surface (the first gate-side inclined surface) 42 is inclined toward the sealing member 22 side from the upper side toward the lower side in the longitudinal direction. When the pit gate 15 is inserted into the slot 14, the upper gate-side inclined surface 42 comes into contact with the slot 14.

Accordingly, if the pit gate 15 is inserted into the slot 14, the upper gate-side inclined surface 42 comes into contact with the slot 14, thereby the upper pressing clamp 23 moves the pit gate 15 toward the sealing member 22 side.

As illustrated in FIGS. 7 and 8, the intermediate pressing clamp 24 is provided with a pair of intermediate gate-side pressing members (second gate-side pressing members) 44 that protrude from both sides of the gate main body 21 (the gate frame 31) in the width direction and a pair of intermediate slot-side pressing members (second slot-side pressing members) 45 that are in contact with a pair of the intermediate gate-side pressing members 44. Furthermore, two sets of the pair of the intermediate slot-side pressing members 45 are provided in accordance with the opposing two sealing surfaces 14c.

The pair of the intermediate gate-side pressing members 44 is formed in a rod shape with the axial direction thereof corresponding to the horizontal direction. Each of the intermediate gate-side pressing members 44 is formed in the shape of a column or a cylinder and is fixed to the gate frame 31 that is located on the side opposite to the sealing member 22 with the waveform member 32 in the gate main body 21 located therebetween. Furthermore, each of the intermediate gate-side pressing members 44 is disposed such that the axial center thereof is located closer to the other side of the sealing member 22 from the center of the gate frame 31 in the thickness direction.

The pair of the intermediate slot-side pressing members 45 are attached to the sealing surfaces 14c of the slot 14 and are disposed on both sides of the pit gate 15 accommodated in the slot 14 in the width direction. Each of the intermediate slot-side pressing members 45 is formed in a wedge shape whose thickness becomes greater from the upper side toward the lower side in the longitudinal direction. Each of the intermediate slot-side pressing members 45 is attached to the sealing surface 14c of the slot 14 and intermediate slot-side inclined surfaces (second slot-side inclined surfaces) 46 are formed on the surface opposite from the surface of the sealing surface 14c. The intermediate slot-side inclined surface 46 is inclined toward the sealing member 22 side (the inner side of the slot 14) from the upper side toward the lower side in the longitudinal direction. When the pit gate 15 is inserted into the slot 14, the intermediate slot-side inclined surface 46 comes into contact with the intermediate gate-side pressing member 44 of the pit gate 15.

Furthermore, a set of the pair of the intermediate slot-side pressing members 45 and the other set of the pair of the intermediate slot-side pressing members 45 are provided at the position facing each other in the thickness direction (in the length direction of the slot 14) of the pit gate 15. Namely, the set of the pair of the intermediate slot-side pressing members 45 is provided on the sealing surface 14c of the slot 14 on the first pit 11 side and the other set of the pair of the intermediate slot-side pressing members 45 is provided on the sealing surface 14c of the slot 14 on the second pit 12 side.

Accordingly, when the pit gate 15 is inserted into the slot 14, the pair of the intermediate gate-side pressing members 44 comes into contact with the set of the pair of (the intermediate slot-side inclined surfaces 46) the intermediate slot-side pressing members 45, whereby the intermediate pressing clamp 24 moves the pit gate 15 toward the sealing member 22 side.

Here, the two intermediate pressing clamps 24 are disposed at a predetermined distance in the longitudinal direction of the gate main body 21. For the two intermediate pressing clamps 24, the shape of the intermediate gate-side pressing members 44 and the placement of the intermediate slot-side pressing member 45 differ so as not to physically interfere with each other when the pit gate 15 is inserted into the slot 14.

Specifically, the pair of the intermediate gate-side pressing members 44 of the intermediate pressing clamps 24 on the upper side in the longitudinal direction is formed such that the length in the axial direction is greater than that of the pair of the intermediate gate-side pressing members 44 of the intermediate pressing clamps 24 on the lower side in the longitudinal direction. Namely, the pair of the intermediate gate-side pressing members 44 on the upper side is formed such that the length thereof in the width direction of the gate main body 21 is great, whereas the pair of the intermediate gate-side pressing members 44 on the lower side is formed such that the length thereof in the width direction of the gate main body 21 is small. Furthermore, the pair of the intermediate slot-side pressing members 45 of the intermediate pressing clamps 24 on the upper side in the longitudinal direction is disposed on the outer side in the width direction of the gate main body 21 than the pair of the intermediate slot-side pressing members 45 of the intermediate pressing clamps 24 on the lower side in the longitudinal direction. Namely, for the pair of the intermediate slot-side pressing members 45 on the upper side, the length thereof in the width direction is great, whereas, for the pair of the intermediate slot-side pressing members 45 on the lower side, the length thereof in the width direction is small.

Accordingly, when the pit gate 15 is inserted into the slot 14, the pair of the intermediate gate-side pressing members 44 on the lower side avoids the pair of the intermediate slot-side pressing members 45 on the upper side. Thereafter, when the pit gate 15 is further inserted into the slot 14, the pair of the intermediate gate-side pressing members 44 on the lower side comes into contact with the pair of the intermediate slot-side pressing members 45 on the lower side and the pair of the intermediate gate-side pressing members 44 on the upper side comes into contact with the pair of the intermediate slot-side pressing members 45 on the upper side.

As illustrated in FIGS. 9 and 10, the lower pressing clamp 25 is provided with lower gate-side pressing member (a third gate-side pressing member) 48 that is provided so as to protrude from the lower side of the gate main body 21 (the gate frame 31) in the longitudinal direction and a pair of lower slot-side pressing members (third slot-side pressing members) 49 that is in contact with the lower gate-side pressing member 48. Furthermore, two sets of the pair of the lower slot-side pressing members 49 are provided in accordance with the opposing two sealing surfaces 14c.

The lower gate-side pressing member 48 is provided so as to extend in the width direction of the gate main body 21 and has a curved surface that is convex towards the lower side. The lower gate-side pressing member 48 is disposed closer to the other side of the sealing member 22 with respect to the center in the thickness direction of the gate frame 31.

The pair of the lower slot-side pressing members 49 is provided at the corner that is formed by the bottom surface 14a and the sealing surface 14c of the slot 14 and is disposed at a predetermined distance in the width direction of the slot 14. Furthermore, the pair of the lower slot-side pressing members 49 is provided, at the position facing each other, on both sides in the width direction of the lower gate-side pressing member 48. Each of the lower slot-side pressing members 49 is formed in a wedge shape whose thickness becomes greater from the upper side toward the lower side in the longitudinal direction. Each of the lower slot-side pressing members 49 are attached to the bottom surface 14a and the sealing surface 14c of the slot 14 and a lower slot-side inclined surface (a third slot-side inclined surface) 50 is formed on the surface opposite from the sealing surface 14c. The lower slot-side inclined surface 50 is inclined on the sealing member 22 side (the inner side of the slot 14) from the upper side toward the lower side in the longitudinal direction. When the pit gate 15 is inserted into the slot 14, the lower slot-side inclined surface 50 comes into contact with the lower gate-side pressing member 48 of the pit gate 15.

Furthermore, a set of the pair of the lower slot-side pressing members 49 and the other set of the pair of the lower slot-side pressing members 49 are provided at the position opposing each other in the thickness direction (in the length direction of the slot 14) of the pit gate 15. Namely, the set of the pair of the lower slot-side pressing members 49 is provided on the sealing surface 14c of the slot 14 on the first pit 11 side and the other set of the pair of the lower slot-side pressing members 49 is provided on the sealing surface 14c of the slot 14 on the second pit 12 side.

Accordingly, when the pit gate 15 is inserted into the slot 14, the lower gate-side pressing member 48 comes into contact with the set of the pair of the (lower slot-side inclined surfaces 50) of the lower slot-side pressing members 49, whereby the lower pressing clamp 25 moves the pit gate 15 toward the sealing member 22 side.

Here, the intermediate pressing clamp 24 includes two sets of the pair of the intermediate slot-side pressing members 45 and, furthermore, the lower pressing clamp 25 includes two sets of the pair of the lower slot-side pressing members 49. This is because the pit gate 15 is replaced so that its position differs by 180 degrees between a case in which the pit gate 15 is brought into close contact with the sealing surface 14c of the slot 14 on the first pit 11 side and a case in which the pit gate 15 is brought into close contact with the sealing surface 14c of the slot 14 on the second pit 12 side. Namely, when the pit gate 15 is brought into close contact with the sealing surface 14c of the slot 14 on the first pit 11 side, the pair of the intermediate slot-side pressing members 45 on the second pit 12 side is used in the intermediate pressing clamp 24 and the pair of the lower slot-side pressing members 49 on the second pit 12 side is used in the lower pressing clamp 25. In contrast, when the pit gate 15 is brought into close contact with the sealing surface 14c of the slot 14 on the second pit 12 side, the pair of the intermediate slot-side pressing members 45 on the first pit 11 side is used in the intermediate pressing clamp 24 and the pair of the lower slot-side pressing members 49 on the first pit 11 side is used in the lower pressing clamp 25.

For the upper pressing clamp 23, the two intermediate pressing clamp 24, and the lower pressing clamp 25 formed in this way, the inclination angles of the upper gate-side inclined surfaces 42, the intermediate slot-side inclined surface 46, and the lower slot-side inclined surfaces 50 are the same. Here, the inclination angle is an inclination angle with respect to the horizontal plane orthogonal to the height direction. If the inclination angles of the upper gate-side inclined surfaces 42, the intermediate slot-side inclined surface 46, and the lower slot-side inclined surface 50 are made the same, the amount of movement of the pit gate 15 that moves toward the sealing member 22 side due to the upper pressing clamps 23, the two intermediate pressing clamps 24, and the lower pressing clamp 25 becomes the same. Namely, the amount of movement of the pit gate 15 toward the sealing member 22 side in accordance with the amount of movement in the height direction becomes equal in the upper pressing clamps 23, the two intermediate pressing clamps 24, and the lower pressing clamp 25. Furthermore, the upper pressing clamps 23, the two intermediate pressing clamps 24, and the lower pressing clamp 25 are disposed at an unequal distance in the longitudinal direction of the pit gate 15. This is because the pitch intervals of the peak portions of the waveform member 32 in the gate main body 21 are unequal.

Figure 11:
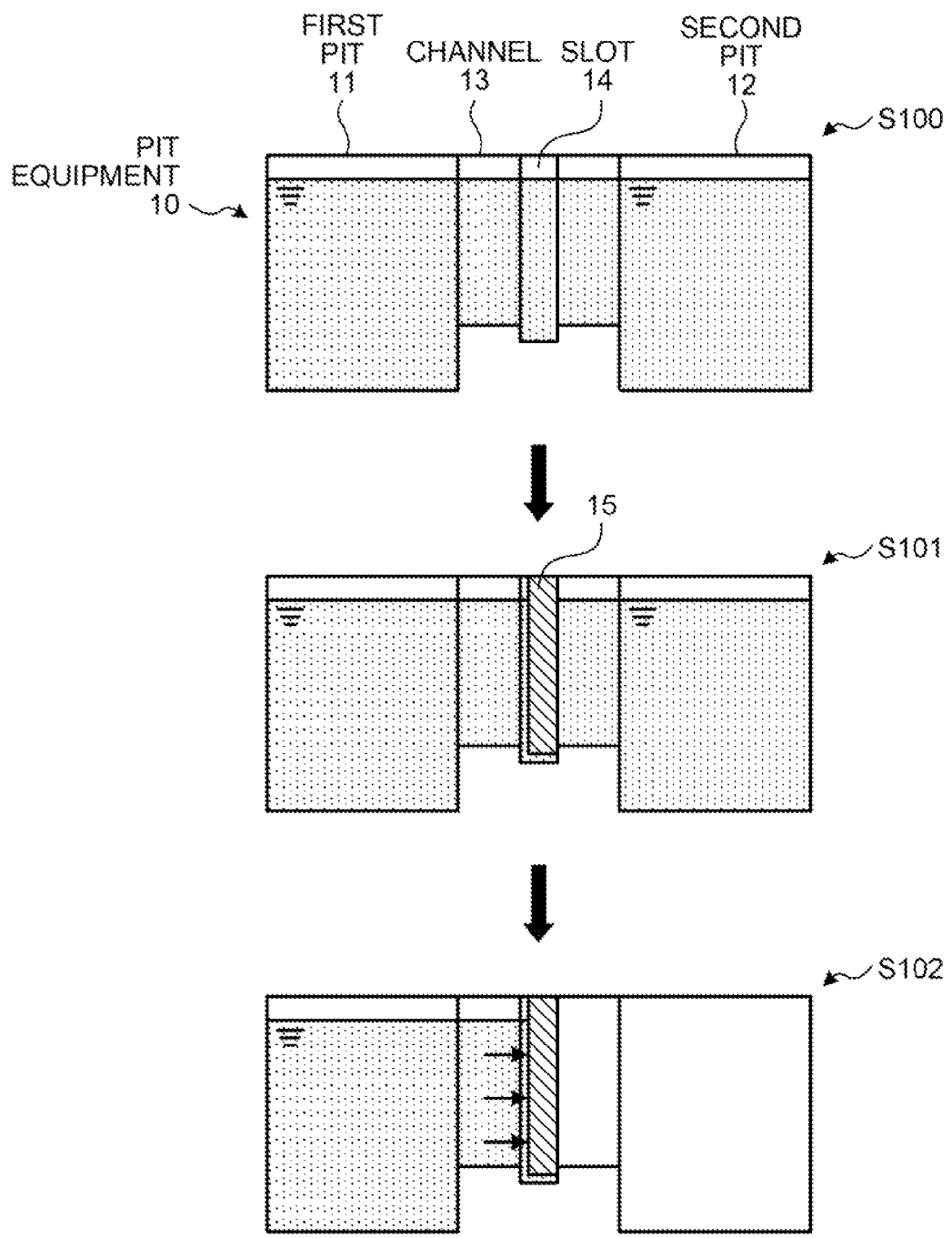
FIG. 11 is a diagram related to an installation method of the pit gate.

In the following, an installation method of the pit gate 15 that is accommodated in the slot 14 will be described with reference to FIG. 11. FIG. 11 is a diagram related to an installation method of the pit gate. As illustrated in FIG. 11, before the installation of the pit gate 15, the first pit 11 and the second pit 12 in the pit equipment 10 are filled with service water (Step S100). At this time, because the pit gate 15 is not installed, the water level of the first pit 11 is the same as that of the second pit 12.

In the state at Step S100, if the service water filled in the second pit 12 in the pit equipment 10 is drained, the pit gate 15 is accommodated in the slot 14 such that the surface on which the sealing member 22 is provided faces toward the second pit 12 side. As a result, the pit gate 15 moves toward the sealing member 22 side due to the upper pressing clamp 23, the two intermediate pressing clamps 24, and the lower pressing clamp 25, thus moving toward the second pit 12 side. Consequently, the sealing member 22 of the pit gate 15 comes into contact with the sealing surface 14c of the slot 14 on the second pit 12 side (Step S101). Thereafter, the pit gate 15 is fixed to the floor surface 5 of the pit equipment 10 via the spacer 35. After the pit gate 15 has been fixed, the intermediate gate-side pressing member 44 of the intermediate pressing clamp 24 is located at an intermediate position with respect to the intermediate slot-side inclined surface 46 of the intermediate slot-side pressing member 45, i.e., at a position between an edge portion on the upper side and the lower side of the intermediate slot-side inclined surface 46. Consequently, the intermediate gate-side pressing member 44 has space for moving, with respect to the intermediate slot-side inclined surface 46, toward the lower side in the height direction. Similarly, the lower gate-side pressing member 48 of the lower pressing clamp 25 is located at an intermediate position with respect to the lower slot-side inclined surface 50 of the lower slot-side pressing member 49, i.e., at a position between an edge portion on the upper side and the lower side of the lower slot-side inclined surface 50. Consequently, the lower gate-side pressing member 48 has space for moving, with respect to the lower slot-side inclined surface 50, toward the lower side in the height direction.

In the state at Step S101, by draining the service water filled in the second pit 12, water pressure from the service water filled in the first pit 11 is applied to the pit gate 15, whereby the pit gate 15 is brought into close contact with the sealing surface 14c of the slot 14 (Step S102).

In the above, a description has been given of a case in which water is drained from the second pit 12; however, if water is drained from the first pit 11, the pit gate 15 is accommodated in the slot 14 such that the surface on which the sealing member 22 is provided faces toward the first pit 11 side. Furthermore, the pit gate 15 is fixed to the floor surface 5 via the spacer 35; however, the height of the spacer 35 may also be adjusted in accordance with the protrusion state of the sealing member 22 toward the slot 14 side. Namely, if the length of the protrusion of the sealing member 22 on the slot 14 side is small, the amount of insertion (amount of movement) of the pit gate 15 in the height direction with respect to the slot 14 is made to increase by making the height of the spacer 35 be small and, consequently, the amount of movement on the sealing member 22 side can be increased. This is because the intermediate gate-side pressing member 44 and the lower gate-side pressing member 48 leave the space for moving on the lower side in the height direction. In this way, by adjusting the height of the spacer 35, it is possible to adjust the contact property of the slot 14 toward the sealing surface 14c in accordance with the degree of degradation of the sealing member 22.

As described above, according to the embodiment, if the pit gate 15 is accommodated in the slot 14 from the upper side toward the lower side in the vertical direction, the pit gate 15 moves toward the sealing member 22 side along the upper gate-side inclined surface 42, the intermediate slot-side inclined surface 46, and the lower slot-side inclined surface 50. Consequently, by using the upper pressing clamp 23, the intermediate pressing clamps 24, and the lower pressing clamp 25, the pit gate 15 can be appropriately moved toward the sealing member 22 side in the vertical direction. Thus, by using the upper pressing clamp 23, the intermediate pressing clamps 24, and the lower pressing clamp 25, because the pit gate 15 with a simple structure can be appropriately moved toward the sealing member 22 side, the sealing member 22 can be appropriately brought into close contact with the slot 14. Consequently, because it is possible to seal between the gate main body 21 and the slot 14 by using the sealing member 22 in a watertight manner, the leakage of service water from the first pit 11 and the second pit 12 can be suppressed.

Furthermore, according to the embodiment, by using the same inclination angles for the upper gate-side inclined surfaces 42, the intermediate slot-side inclined surfaces 46, and the lower slot-side inclined surfaces 50, the amount of movement of the pit gate 15 toward the sealing member 22 side with respect to the amount of movement of the pit gate 15 in the vertical direction can be made equal to the amount of movement of the upper pressing clamps 23, the intermediate pressing clamps 24, and the lower pressing clamp 25. Consequently, the pressing force of the pit gate 15 to the slot 14 side can be made uniform in the vertical direction of the pit gate 15.

Furthermore, according to the embodiment, by forming the sealing member 22 protruding toward the slot 14 side in cross section, the shape of the sealing member 22 can be easily brought into close contact with the slot 14.

Furthermore, according to the embodiment, by disposing the intermediate gate-side pressing member 44 at the opposite side from the sealing member 22 with respect to the center in the thickness direction of the gate main body 21, the intermediate gate-side pressing member 44 can be disposed closer to the intermediate slot-side pressing member 45 side; therefore, it is possible to appropriately ensure the amount of movement of the intermediate gate-side pressing member 44 toward the sealing member 22 side.

Furthermore, according to the embodiment, by providing two sets of the pair of the intermediate slot-side pressing members 45 and two sets of the pair of the lower slot-side pressing members 49, the position of the pit gate 15 can be replaced; therefore, it is possible to drain the water in the first pit 11 and the second pit 12.

Furthermore, according to the embodiment, even if a plurality of the intermediate pressing clamps 24 is provided in the vertical direction, the lengths of the intermediate gate-side pressing members 44 in the axial direction are made to differ between the upper side and the lower side and the placements of the intermediate slot-side pressing members 45 in the width direction are made to differ between the upper side and the lower side, whereby it is possible to avoid physical interference between the intermediate pressing clamps 24.

Furthermore, according to the embodiment, by reducing the pitch between the peak portions of the waveform member 32 toward the lower side, the pit gate 15 has a structure that can appropriately endure water pressure.

Furthermore, according to the embodiment, by using the pit gate 15 that has a simple structure, the channel 13 can be partitioned in a watertight manner. Consequently, even if service water in one of the first pit 11 and the second pit 12 is drained, it is possible to suppress the service water from leaking from the other one of the pits that is filled with the service water. Furthermore, in the other one of the pits that is filled with the service water, fuel used in the nuclear power facility can be appropriately treated.

Furthermore, according to the embodiment, by setting the position of the pit gate 15 with respect to the slot 14 to the position in accordance with the first pit 11 or the second pit 12 from which the service water is drained and by accommodating the pit gate 15 in the slot 14, the channel 13 can be easily partitioned.

Furthermore, in the embodiment, the upper pressing clamp 23, the two intermediate pressing clamps 24, and the lower pressing clamp 25 are used; however, the configuration is not particularly limited thereto and any one of the pressing clamps 23, 24, and 25 may be used. Namely, one of the upper pressing clamp 23, the intermediate pressing clamps 24, and the lower pressing clamp 25 may also be used as a single unit; a plurality of the upper pressing clamp 23, the intermediate pressing clamps 24, and the lower pressing clamp 25 may also be used; or the upper pressing clamp 23, the intermediate pressing clamps 24, and the lower pressing clamp 25 may also be appropriately used in combination.

Furthermore, in the embodiment, the cross-sectional shape of the sealing member 22 is substantially triangular; however, the shape is not particularly limited thereto. Any shape may be used as long as the sealing member 22 can be brought into close contact with the sealing surface 14c.

REFERENCE SIGNS LIST 1 nuclear power facility
5 floor surface
10 pit equipment
11 the first pit
12 the second pit
13 channel
14 slot
15 pit gate
21 gate main body
22 sealing member
23 upper pressing clamp
24 intermediate pressing clamp
25 lower pressing clamp
31 gate frame
32 waveform member
35 spacer
41 upper gate-side pressing member
42 upper gate-side inclined surface
44 intermediate gate-side pressing member
45 intermediate slot-side pressing member
46 intermediate slot-side inclined surface
48 lower gate-side pressing member
49 lower slot-side pressing member 50 lower slot-side inclined surface

The invention claimed is:

1. A pit gate that is accommodated in a slot and that seals service water retained in the pit in a watertight manner, the pit gate comprising:
a gate main body;
a sealing member that is provided on a surface opposite to the slot in the gate main body and that seals between the gate main body and the slot in a watertight manner; and
a pressing clamp that is provided in the gate main body and that moves the gate main body toward the sealing member side due to a weight of the gate main body itself, wherein
the pressing clamp includes
a second gate-side pressing member that is shaped as a rod and that is provided so as to protrude from the gate main body along the horizontal direction, and
a second slot-side pressing member that is in contact with the second gate-side pressing member and that is provided in the slot that faces a surface opposite from a surface on which the sealing member of the gate main body is provided, and
the second slot-side pressing member is formed in a wedge shape whose thickness becomes greater from the upper side toward the lower side in the vertical direction, so that a second slot-side inclined surface that is inclined toward the sealing member side from the upper side toward the lower side in the vertical direction is formed, and
the second gate-side pressing member comes into contact with the second slot-side inclined surface, so that the second gate-side pressing member moves the gate main body toward the sealing member side.

2. The pit gate according to claim 1, wherein the sealing member is formed so as to protrude toward the slot side in cross section.

3. The pit gate according to claim 1, wherein
the pressing clamp includes a first gate-side pressing member that is provided on a surface of the gate main body opposite from a surface on which the sealing member is provided, and
the first gate-side pressing member is formed in a wedge shape whose thickness becomes thinner from the upper side toward the lower side in the vertical direction, so that a first gate-side inclined surface that is inclined toward the sealing member side from the upper side toward the lower side in the vertical direction is formed.

4. The pit gate according to claim 1, wherein
the pressing clamp includes
a third gate-side pressing member that is provided so as to protrude from the gate main body toward the lower side in the vertical direction, and
a third slot-side pressing member that is in contact with the third gate-side pressing member and that is provided on a bottom portion of the slot, and
the third slot-side pressing member is formed in a wedge shape whose thickness becomes greater from the upper side toward the lower side in the vertical direction, so that a third slot-side inclined surface that is inclined toward the sealing member side from the upper side toward the lower side in the vertical direction is formed, and
the third gate-side pressing member comes into contact with the third slot-side inclined surface, so that the third gate-side pressing member moves the gate main body toward the sealing member side.

5. The pit gate according to 1, wherein
a plurality of the pressing clamps is provided at a predetermined distance in the vertical direction of the gate main body,
the plurality of the pressing clamps includes a first pressing clamp, the second pressing clamp, and a third pressing clamp,
the first pressing clamp includes a first gate-side pressing member that is provided on a surface of the gate main body opposite from a surface on which the sealing member is provided,
the first gate-side pressing member is formed in a wedge shape whose thickness becomes thinner from the upper side toward the lower side in the vertical direction, so that a first gate-side inclined surface that is inclined toward the sealing member side from the upper side toward the lower side in the vertical direction is formed, and
the third pressing clamp includes
a third gate-side pressing member that is provided so as to protrude from the gate main body toward the lower side in the vertical direction, and
a third slot-side pressing member that is in contact with the third gate-side pressing member and that is provided on a bottom portion of the slot, and
the third slot-side pressing member is formed in a wedge shape whose thickness becomes greater from the upper side toward the lower side in the vertical direction, so that a third slot-side inclined surface that is inclined toward the sealing member side from the upper side toward the lower side in the vertical direction is formed, and
the third gate-side pressing member comes into contact with the third slot-side inclined surface, so that the third gate-side pressing member moves the gate main body toward the sealing member side.

6. The pit gate according to claim 5, wherein the first gate-side inclined surface, the second slot-side inclined surface, and the third slot-side inclined surface have the same inclination angle with respect to the horizontal plane.

7. The pit gate according to claim 5 wherein,
the thickness direction of the gate main body is a direction in which a surface on which the sealing member is provided faces a surface opposite side on which the sealing member is provided, and
the second gate-side pressing member is provided closer to the other side on which the sealing member is provided with respect to the center in the thickness direction of the gate main body.

8. The pit gate according to claim 5, wherein the second slot-side pressing member and the third slot-side pressing member are provided in the slot that faces a surface opposite from a surface on which the sealing member of the gate main body is provided and are provided in the slot that faces the surface on which the sealing member of the gate main body is provided.

9. The pit gate according to claim 5, wherein
a plurality of the second pressing clamps is provided at a predetermined distance in the vertical direction of the gate main body,
the second gate-side pressing member on the upper side in the vertical direction is formed such that the protruding length from the gate main body is greater than that of the second gate-side pressing member on the lower side in the vertical direction, and
the second slot-side pressing member on the upper side in the vertical direction is disposed on the outer side in the horizontal direction with respect to the gate main body than the second slot-side pressing member on the lower side in the vertical direction.

10. The pit gate according to claim 5, wherein
the gate main body includes a waveform member that has a wave shape and in which peak portions and valley portions are alternately formed from the upper side toward the lower side in the vertical direction, and
the waveform member is formed such that the pitch between the adjacent peak portions in the vertical direction is narrower toward the lower side in the vertical direction.

11. A pit equipment, comprising:
a first pit;
a second pit;
a channel that connects the first pit and the second pit;
a slot provided in the channel; and
the pit gate according to claim 1 accommodated in the slot.

12. A nuclear power facility comprising the pit equipment according to claim 11.

13. An installation method comprising installing the pit gate according to claim 1 in a pit equipment including a first pit, a second pit, a channel that connects the first pit and the second pit, and a slot provided in the channel, the installation method further comprising:
installing, in a state in which the first pit, the second pit, and the channel are filled with the service water, by facing a surface on which the sealing member is provided, the pit gate in the slot on the first pit side or the second pit side from which the service water is supposed to be drained.

14. The installation method according to claim 13, further comprising:
forming the first pit and the second pit by being depressed from a floor surface;
fixing the pit gate to the floor surface via a spacer; and
adjusting the height of the spacer in accordance with the protrusion state of the sealing member toward the slot side.

* * * * *